US012696034B2

(12) United States Patent
Matsunami et al.

(10) Patent No.: US 12,696,034 B2
(45) Date of Patent: Jul. 28, 2026

(54) COMPUTER-IMPLEMENTED BASS ENHANCEMENT METHOD AND BASS ENHANCEMENT APPARATUS

(71) Applicant: YAMAHA CORPORATION, Hamamatsu (JP)

(72) Inventors: Go Matsunami, Hamamatsu (JP); Nobuaki Himeno, Hamamatsu (JP); Masahiro Nakanishi, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 226 days.

(21) Appl. No.: 18/738,333

(22) Filed: Jun. 10, 2024

(65) Prior Publication Data

US 2024/0422478 A1 Dec. 19, 2024

(30) Foreign Application Priority Data

Jun. 13, 2023 (JP) ................................. 2023-096832

(51) Int. Cl.
*H04R 3/04* (2006.01)
*G08B 6/00* (2006.01)

(52) U.S. Cl.
CPC ................. *H04R 3/04* (2013.01); *G08B 6/00* (2013.01); *H04R 2499/13* (2013.01)

(58) Field of Classification Search
CPC ........................................................ H04R 3/04
See application file for complete search history.

(56) References Cited

U.S. PATENT DOCUMENTS

| | | | | |
|---|---|---|---|---|
| 10,405,094 | B2 * | 9/2019 | You | H03G 5/005 |
| 12,548,586 | B2 * | 2/2026 | Jang | G06N 3/0475 |
| 2010/0320819 | A1 * | 12/2010 | Cohen | A61H 23/0236 381/104 |
| 2013/0003989 | A1 * | 1/2013 | Tsang | G10L 21/0364 381/102 |
| 2015/0016614 | A1 * | 1/2015 | Buyens | H04S 5/00 381/27 |

FOREIGN PATENT DOCUMENTS

| | | | | |
|---|---|---|---|---|
| CN | 104936088 A | * | 9/2015 | |
| EP | 2148321 A1 | * | 1/2010 | G10H 3/125 |
| JP | 2007067628 A | * | 3/2007 | |

OTHER PUBLICATIONS

"Demucs Music Source Separation". https://github.com/facebookresearch/demucs. Oct. 27, 2022.

* cited by examiner

*Primary Examiner* — Olisa Anwah
(74) *Attorney, Agent, or Firm* — ROSSI, KIMMS & McDOWELL LLP

(57) ABSTRACT

A computer-implemented bass enhancement method includes: extracting, from an input audio signal including harmonic sound components and inharmonic sound components, an inharmonic sound signal representing the inharmonic sound components which are other than the harmonic sound components; generating, from the inharmonic sound signal, a low frequency signal with a frequency that is one N-th a frequency of a fundamental wave component of the inharmonic sound signal, where N is an integer greater than one; and generating, from the low frequency signal and the input audio signal, a bass-range enhancement signal that enhances bass-range frequencies of the input audio signal.

10 Claims, 5 Drawing Sheets

COMPUTER-IMPLEMENTED BASS ENHANCEMENT METHOD AND BASS ENHANCEMENT APPARATUS

CROSS REFERENCE TO RELATED APPLICATION

This Application is based on, and claims priority from, Japanese Patent Application No. 2023-96832, filed on Jun. 13, 2023, the entire contents of which are incorporated herein by reference.

BACKGROUND

Technical Field

This disclosure relates to a bass enhancement method, to a bass enhancement apparatus, and to an audio system.

Background Information

In the field of audio systems, apparatuses are known that are used to enhance a bass range of a sound represented by an audio signal. For example, Japanese Patent Application Laid-Open Publication No. 2007-67628 discloses a bass enhancement reproduction apparatus. This bass enhancement reproduction apparatus has a low-pass filter that extracts a low frequency component from an input signal, generates an ultra-low frequency component, a frequency of which is half that of the extracted low frequency component, adds the ultra-low frequency component to the extracted low frequency component to generate a new component, and adds the new component to the input signal to generate an output signal having an enhanced bass range.

Simply stated, the above-described bass enhancement reproduction apparatus adds the ultra-low frequency component to the original input signal. However, this apparatus suffers from a disadvantage in that a sound, which has harmonic sound components, produced by a musical instrument and a continuous sound produced by the musical instrument that are represented by the generated output signal are prone to distortion.

SUMMARY

An object of one aspect of this disclosure is to provide a technique for generating a signal that has an enhanced bass range, and that substantially prevents distortion in a sound and a continuous sound of a musical instrument that are represented by the signal.

In one aspect, a computer-implemented bass enhancement method includes: extracting, from an input audio signal including harmonic sound components and inharmonic sound components, an inharmonic sound signal representing the inharmonic sound components which are other than the harmonic sound components; generating, from the inharmonic sound signal, a low frequency signal with a frequency that is one N-th a frequency of a fundamental wave component of the inharmonic sound signal, where N is an integer greater than one; and generating, from the low frequency signal and the input audio signal, a bass-range enhancement signal that enhances bass-range frequencies of the input audio signal.

In another aspect, a bass enhancement apparatus includes: at least one memory storing instructions; and at least one processor configured to execute the instructions to: extract, from an input audio signal including harmonic sound components and inharmonic sound components, an inharmonic sound signal representing the inharmonic sound components which are other than the harmonic sound components; generate, from the inharmonic sound signal, a low frequency signal with a frequency that is one N-th a frequency of a fundamental wave component of the inharmonic sound signal, where N is an integer greater than one; and generate, from the low frequency signal and the input audio signal, a bass-range enhancement signal that enhances bass-range frequencies of the input audio signal.

In yet another aspect, a bass enhancement apparatus includes: at least one memory storing instructions; and at least one processor configured to execute the instructions to: extract, from an input audio signal including harmonic sound components and inharmonic sound components, an inharmonic sound signal representing the inharmonic sound components which are other than the harmonic sound components; generate, from the inharmonic sound signal, a low frequency signal with a frequency that is one N-th a frequency of a fundamental wave component of the inharmonic sound signal, where N is an integer greater than one; and provide an output audio signal including at least the low frequency signal to an actuator configured to vibrate a seat.

DETAILED DESCRIPTION

A: First Embodiment

A1: Configuration of Bass Enhancement Apparatus

Figure 1:
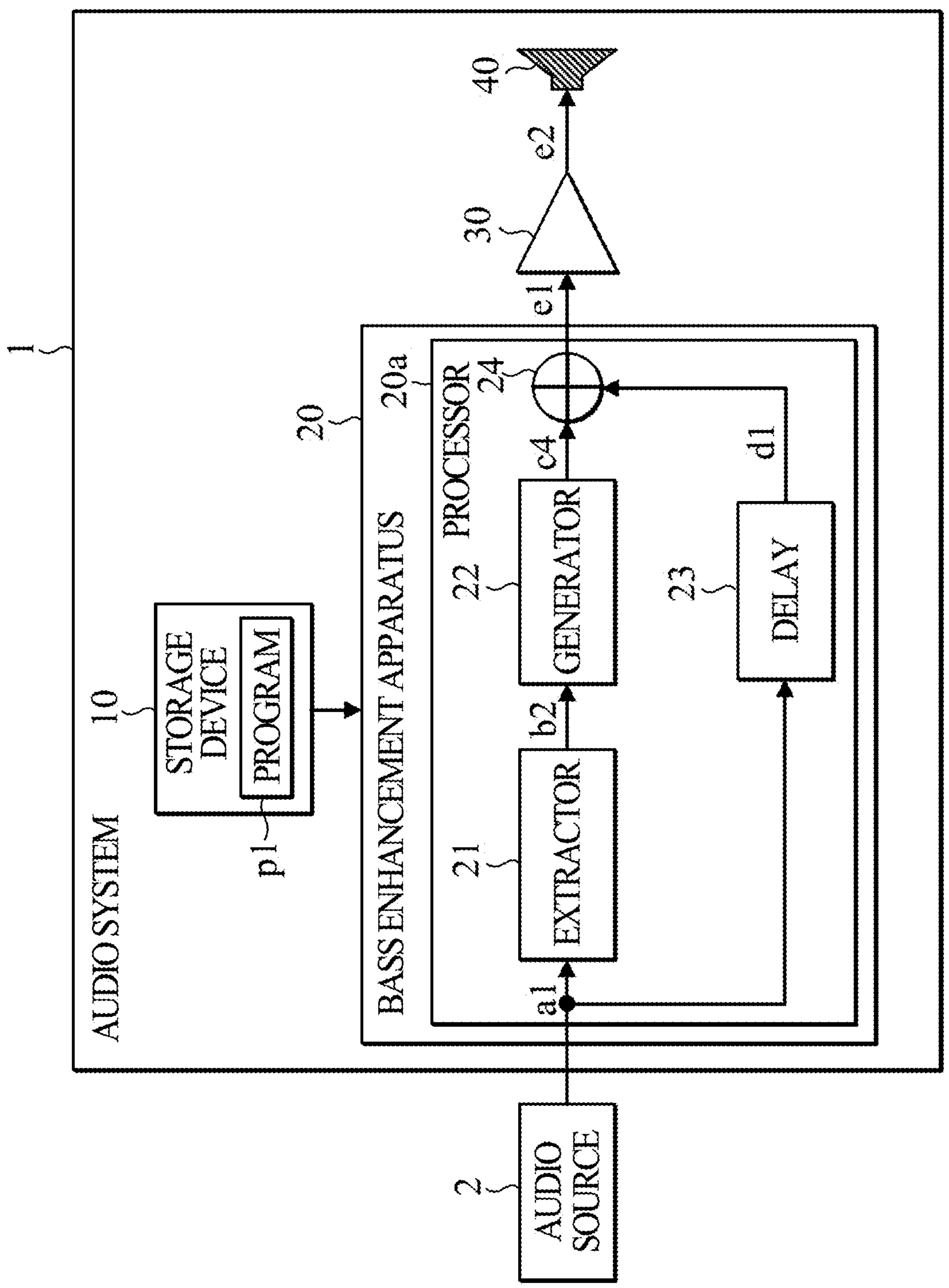
FIG. 1 is a diagram showing an example of an audio system that includes a bass enhancement apparatus according to a first embodiment.

FIG. 1 is a diagram showing an example of an audio system 1 that includes a bass enhancement apparatus 20 according to a first embodiment. The audio system 1 is provided in a vehicle such as an automobile. As shown in FIG. 1, the audio system 1 includes a storage device 10, the bass enhancement apparatus 20, an amplifier 30, and a loudspeaker 40.

In the audio system 1, the bass enhancement apparatus 20 generates a bass-range enhancement signal e1 from an input audio signal a1 input from an audio source 2. The amplifier 30 amplifies the bass-range enhancement signal e1 to generate an amplified audio signal e2. The amplifier 30 transmits the amplified audio signal e2 to the loudspeaker 40. The loudspeaker 40 emits a sound based on the amplified audio signal e2.

The storage device 10 includes one or more computer readable recording mediums (for example, one or more non-transitory computer readable recording mediums). The storage device 10 includes one or more nonvolatile memories and one or more volatile memories. Examples of the nonvolatile memories include a read only memory (ROM), an erasable programmable read only memory (EPROM), and an electrically erasable programmable read only memory (EEPROM). Examples of the volatile memories include a random access memory (RAM).

The storage device 10 stores a program p1, which includes instructions, and various kinds of information. The program p1 defines an operation of the bass enhancement apparatus 20. The storage device 10 may store the program p1 that has been read from a storage device in a server (not shown). In this case, the storage device in the server is an example of a recording medium readable by a computer.

The bass enhancement apparatus 20 includes one or more processors 20*a*. The bass enhancement apparatus 20 reads the program p1 from the storage device 10. In other words, the one or more processors 20*a* read the program p1 from the storage device 10. The bass enhancement apparatus 20 executes the program p1 to function as an extractor 21, a generator 22, a delay 23, and a synthesizer 24. In other words, the one or more processors 20*a* execute the program p1 to function as the extractor 21, the generator 22, the delay 23, and the synthesizer 24. At least one of the extractor 21, the generator 22, the delay 23, and the synthesizer 24 may be configured as circuitry of a digital signal processor (DSP), an application specific integrated circuit (ASIC), a programmable logic device (PLD), and a field programmable gate array (FPGA).

The input audio signal a1 is input from the audio source 2 to the extractor 21. The input audio signal a1 includes harmonic sound components and inharmonic sound components. The harmonic sound components are sound components produced by one or more musical instruments such as a string instrument and a wind instrument. The one or more musical instruments that produce the harmonic sound components may each be referred to as a "harmonic musical instrument," and the harmonic sound components may be referred to as "harmonic musical instrument sound components." The harmonic sound components have a fundamental frequency and frequencies that are positive integer multiples of the fundamental frequency. For example, sound produced by each of a string instrument, a wind instrument, and a singing voice has harmonic sound components. These harmonic sound components contribute to pitch and timbre, and are continuous. In contrast, the inharmonic sound components are components other than the harmonic sound components. The inharmonic sound components include more random frequency components than harmonic sound components, and are not continuous. The inharmonic sound components include percussive sound components, and may be referred to as "percussive sound components." In practice, the inharmonic sound components are mostly sound components of a percussion instrument such as drum kit, including drums and cymbals. Thus, the percussive sound components may be referred to as the inharmonic sound components. However, it is of note here that sound produced by a musical instrument other than a percussion instrument may also include percussive sound components, depending on a method of playing the musical instrument. The percussive sound components contribute to rhythm and sound intensity.

The extractor 21 extracts and separates, from the input audio signal a1, the harmonic sound components and the percussive sound components. The extractor 21 generates a percussion instrument signal b2 representing the percussive sound components. The percussive sound components are included in examples of the "inharmonic sound components." The percussion instrument signal b2 is included in examples of an "inharmonic sound signal" of a musical instrument in which inharmonic sound components are predominant.

The generator 22 generates a low frequency signal c4 from the percussion instrument signal b2. The low frequency signal c4 is a signal having a frequency that is half that of a fundamental wave component of the percussion instrument signal b2. The generator 22 is an example of a "first generator."

The delay 23 generates a delayed audio signal d1 from the input audio signal a1. The delayed audio signal d1 is a signal obtained by delaying the input audio signal a1 for a time period required to generate the low frequency signal c4 from the input audio signal a1.

The synthesizer 24 generates the bass-range enhancement signal e1 by combining the low frequency signal c4 with the delayed audio signal d1. The bass-range enhancement signal e1 is a signal that enhances bass-range frequency components of the delayed audio signal d1. As described above, the delayed audio signal d1 is obtained by delaying the input audio signal a1. Thus, the synthesizer 24 generates the bass-range enhancement signal e1 from the low frequency signal c4 and the input audio signal a1. A combination of the delay 23 and the synthesizer 24 is an example of a "second generator."

Figure 2:
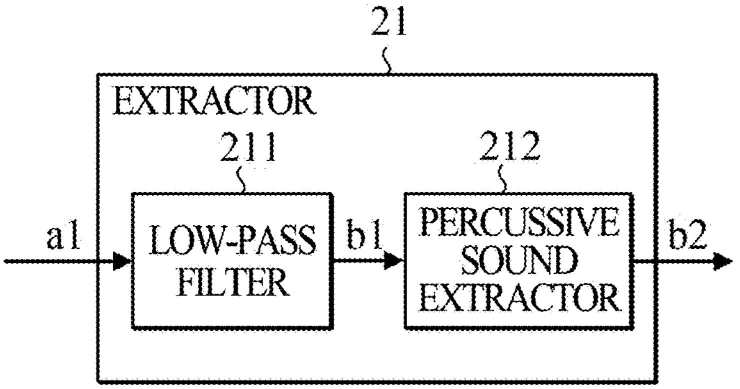
FIG. 2 is a block diagram showing functions of the extractor shown in FIG. 1.
Figure 3:
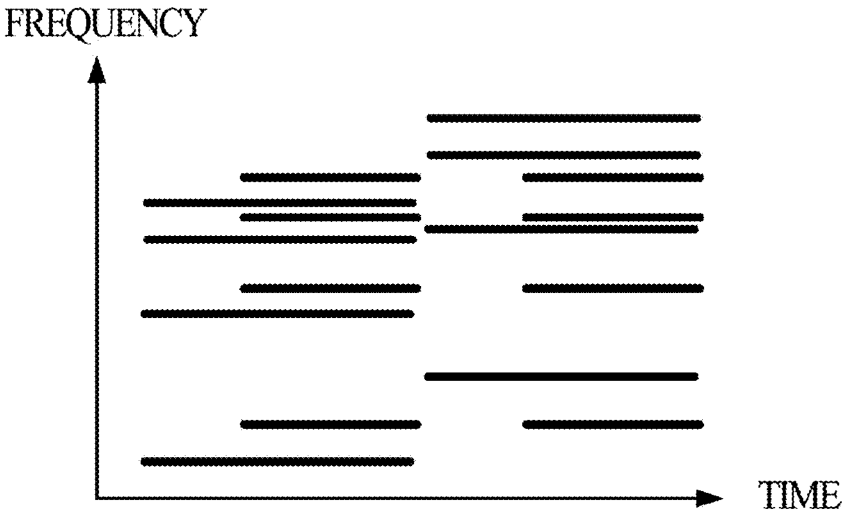
FIG. 3 is a diagram showing an example of a spectrogram of harmonic sound components.
Figure 4:
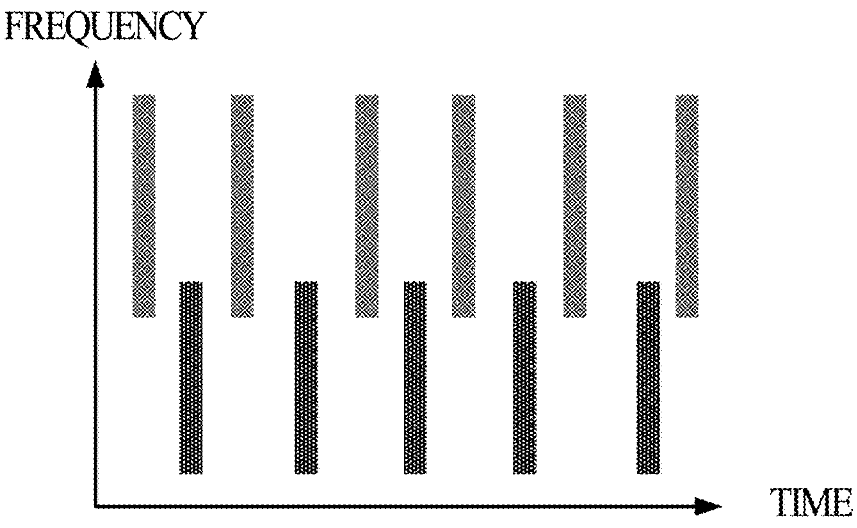
FIG. 4 is a diagram showing an example of a spectrogram of percussive sound components.

Referring to FIGS. 2 to 4, the extractor 21 will now be described in detail. FIG. 2 is a block diagram showing functions of the extractor 21 shown in FIG. 1. As shown in FIG. 2, the extractor 21 includes a low-pass filter 211 and a percussive sound extractor 212.

The low-pass filter 211 is a second-order infinite impulse response (IIR) filter. The low-pass filter 211 has a cutoff frequency of 200 Hz. The low-pass filter 211 generates a first bass signal b1 by reducing frequency components with frequencies that exceed 200 Hz of the input audio signal a1.

The cutoff frequency of the low-pass filter 211 is not limited to 200 Hz. For example, the cutoff frequency of the low-pass filter 211 may be within a range of 200 Hz plus or minus K % (for example, 20%). The low-pass filter 211 is not limited to the second-order IIR filter. For example, the low-pass filter 211 may be a first-order IIR filter or a third-order IIR filter. Alternatively, the low-pass filter 211 may be a digital filter different from an IIR filter. The digital filter is, for example, a finite impulse response (FIR) filter.

The percussive sound extractor 212 separates the harmonic sound components and the percussive sound components in the first bass signal b1 and extracts the percussion instrument signal b2. The percussive sound extractor 212 uses a known harmonic-percussive source separation (HPSS) to separate the harmonic sound components and the percussive sound components.

HPSS is a technique for performing filtering processing on an audio signal. In using HPSS, a short-time Fourier transform is performed on an audio signal, and as a result, the audio signal is decomposed in a time-frequency domain to obtain features represented by the harmonic sound components and features represented by the percussive sound components. In HPSS, the filtering processing is performed on the audio signal by utilizing differences in the features represented by the harmonic sound components and the features represented by the percussive sound components. By performing the short-time Fourier transform, the audio signal is divided into segments with a window function that has a predetermined size, and a Fourier transform is performed on each of the segments to calculate a spectrum of each of the segments. The time-frequency domain is a plane that has a vertical axis representing frequency and a horizontal axis representing time. A graph that shows, in the time-frequency domain, an intensity of the audio signal on which the short-time Fourier transform is performed is referred to here as a spectrogram. The spectrogram has a vertical axis representing frequency and a horizontal axis representing time. Thus, the vertical axis can be referred to as a frequency axis, and the horizontal axis can be referred to as a time axis.

FIG. 3 is a diagram showing an example of a spectrogram of the harmonic sound components. FIG. 4 is a diagram showing an example of a spectrogram of the percussive sound components.

The harmonic sound components constitute a continuous sound with a readily recognizable pitch. As shown in FIG. 3, in the time-frequency domain, the harmonic sound components are intermittent in a direction along the frequency axis and are smooth in a direction along the time axis.

On the other hand, the percussive sound components constitute a non-continuous sound with a pitch that cannot be readily recognized. As shown in FIG. 4, in the time-frequency domain, the percussive sound components are smooth in the direction along the frequency axis, and are intermittent in the direction along the time axis.

The harmonic sound components and the percussive sound components in the signal are separated by performing filtering processing on a spectrogram of the signal based on differences in smoothness between the harmonic sound components and the percussive sound components.

As a filter configured to extract the harmonic sound components, for example, a filter is assumed that has a vertical elongated rectangular shape in a direction along the vertical axis of the spectrogram. By using the vertical elongated rectangular filter to average the spectrogram along the vertical axis, the harmonic sound components can be extracted. In addition, by using the vertical elongated rectangular filter to average the spectrogram along a part of the time axis that is within a time range of the filter, percussive sound components can be removed.

As a filter configured to extract the percussive sound components, for example, a filter is assumed that has a horizontal elongated rectangular shape in a direction along the horizontal axis of the spectrogram. By using the horizontal elongated rectangular filter to average the spectrogram along the horizontal axis, the percussive sound components can be extracted. In addition, by using the horizontal elongated rectangular filter to average the spectrogram along a part of the frequency axis that is within a frequency range of the filter, harmonic sound components can be removed.

More specifically, the percussive sound extractor 212 performs the short-time Fourier transform on the first bass signal b1 to generate the spectrogram. The percussive sound extractor 212 performs the filtering processing on the generated spectrogram to extract the percussive sound components. The percussive sound extractor 212 performs an inverse short-time Fourier transform on the extracted percussive sound components to convert the extracted percussive sound components into an audio signal in a time domain. The percussive sound extractor 212 outputs the audio signal in the time domain as the percussion instrument signal b2.

Figure 5:
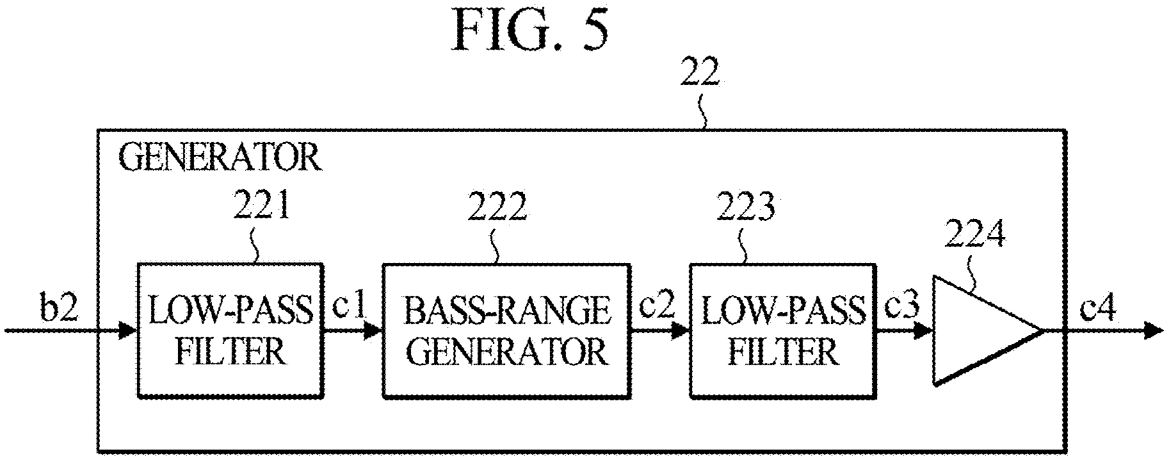
FIG. 5 is a block diagram showing functions of a generator shown in FIG. 1.

Referring to FIGS. 5 to 9, the generator 22 will now be described in detail. FIG. 5 is a block diagram showing functions of the generator 22 shown in FIG. 1. As shown in FIG. 5, the generator 22 includes a low-pass filter 221, a bass-range generator 222, a low-pass filter 223, and a gain controller 224.

The low-pass filter 221 extracts bass-range components from the percussion instrument signal b2 to output a second bass signal c1 representing the bass-range components. The low-pass filter 221 has a cutoff frequency of 200 Hz. Thus, the low-pass filter 221 extracts, from the percussion instrument signal b2, bass-range components with frequencies that are less than or equal to 200 hz. The cutoff frequency of the low-pass filter 221 is not limited to 200 Hz. For example, the cutoff frequency of the low-pass filter 221 may be within a range of 200 Hz plus or minus K % (for example, 20%).

The bass-range generator 222 generates, from the second bass signal c1, a signal with a frequency that is half that of the fundamental wave component of the percussion instrument signal b2. The frequency of the generated signal is one octave lower than the frequency of the second bass signal c1. The generated signal is referred to as a bass-range percussion instrument signal c2.

As a method for generating the bass-range percussion instrument signal c2, either a method for generating the bass-range percussion instrument signal c2 in a time domain or a method for generating the bass-range percussion instrument signal c2 in a frequency domain can be used. As the method for generating the bass-range percussion instrument signal c2 in a time domain, a combination of a common zero-crossing detection method and a method for generating a wave having a double period of an original wave can be used. In the method for generating the wave, a straight line is set based on zero-crossing points of the original wave, and a part of the original wave is reflected across the straight line.

The zero-crossing detection method is performed by changing an output of a comparator. The output of the comparator changes in response to a wave of a signal crossing a zero-voltage level. By use of the zero-crossing detection method, a square wave having a period equal to that of the signal is obtained. Then, by dividing a frequency of the square wave by two, a bass-range component is obtained that has a frequency that is half that of the square wave.

As the method for generating the bass-range percussion instrument signal c2 in a frequency domain, a method may be used in which a fast Fourier transform (FFT) is performed on a signal in a time domain to convert the signal in the time domain into a signal in a frequency domain. Pitches in the signal in the frequency domain are detected, and a voltage controlled oscillator (VCO) is used to generate a signal with a frequency that is half that of the detected pitches.

Figure 6:
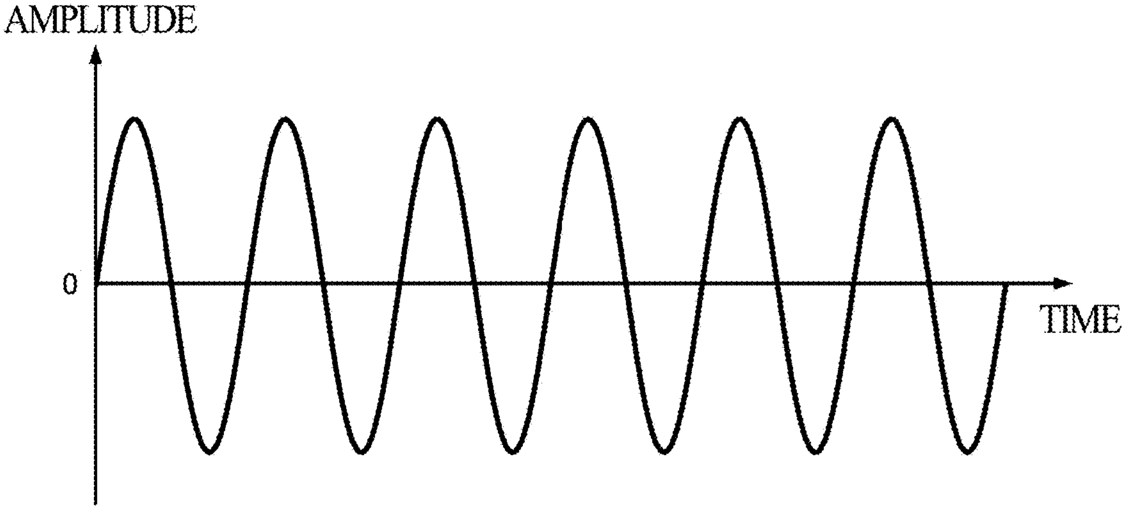
FIG. 6 is a diagram showing an example of a second bass signal.
Figure 7:
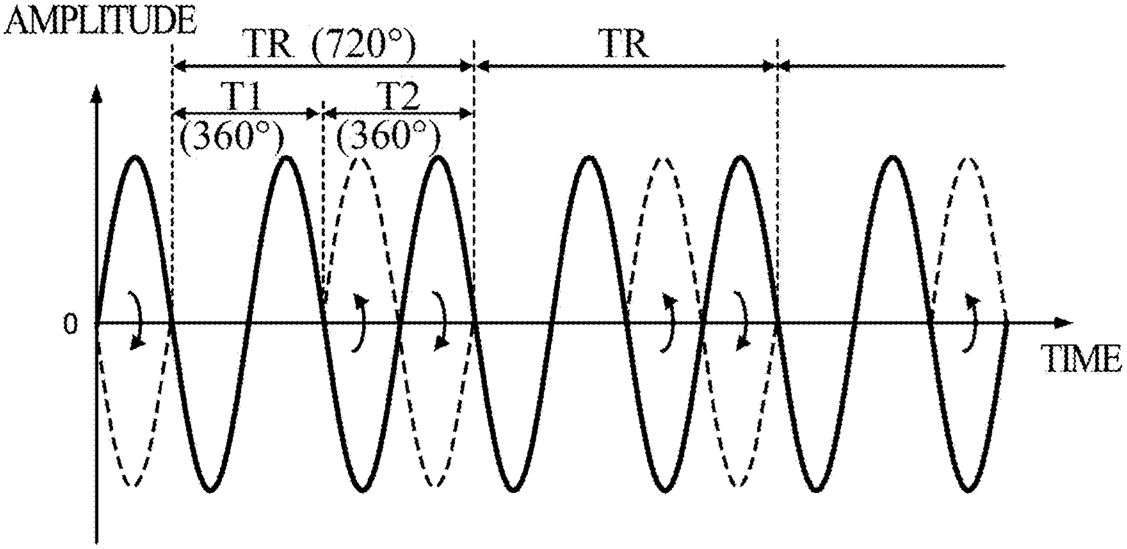
FIG. 7 is an explanatory diagram showing reflections of parts of the second bass signal.
Figure 8:
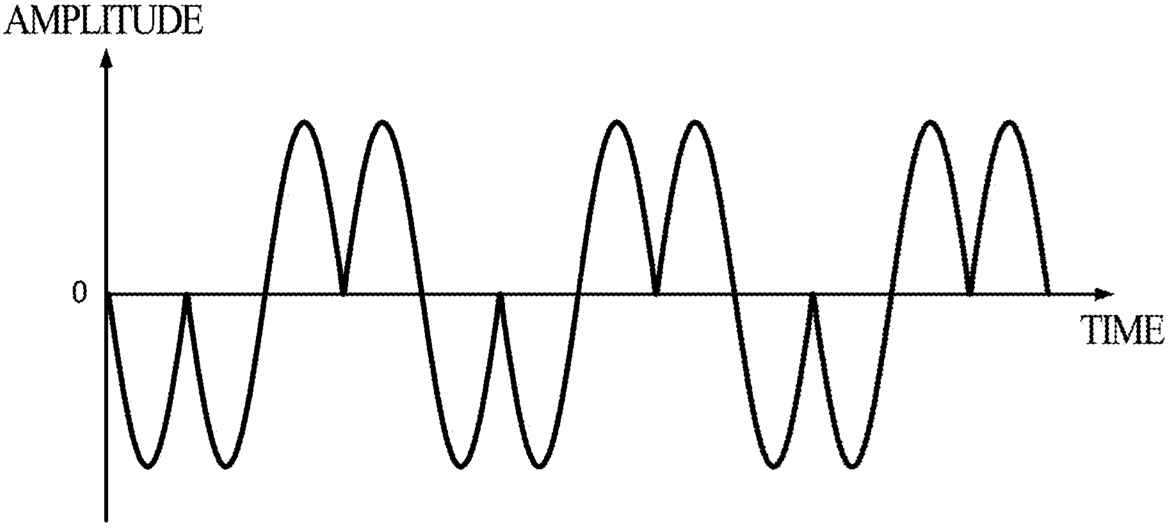
FIG. 8 is a diagram showing an example of a bass-range percussion signal.

In this embodiment, the combination of the common zero-crossing detection method and the method for generating a wave having a double period of an original wave is used. Referring to FIGS. 6 to 8, a method will now be described in which the bass-range generator 222 generates the bass-range percussion instrument signal c2. FIG. 6 is a diagram showing an example of the second bass signal c1. FIG. 7 is an explanatory diagram showing reflections of parts the second bass signal c1. FIG. 8 is a diagram showing an example of the bass-range percussion instrument signal c2.

In the following description, an example will be described in which the second bass signal c1 for input into the bass-range generator 222 is a sine wave, as shown in FIG. 6. As shown in FIG. 7, the bass-range generator 222 reflects a part of the sine wave across a zero-level line every other 360 degree phase in a phase range TR of 720 degrees. The phase range TR is constituted of two periods of the sine wave, and repeats as a unit. The phase range TR has a section T1 and a section T2. The bass-range generator 222 does not reflect the sine wave in the section T1, but does reflect the sine wave in the section T2.

By the processing shown in FIG. 7, the signal having the waveform shown in FIG. 6 is changed to a signal having the waveform shown in FIG. 8. The signal having the waveform shown in FIG. 8 has a period that is twice that of the percussion instrument signal b2. As described above, from the second bass signal c1 extracted by the low-pass filter 221, the bass-range percussion instrument signal c2 is generated that has a period twice that of the second bass signal c1. In other words, from the second bass signal c1, the bass-range percussion instrument signal c2 is generated with a frequency that is one octave lower than that of the second bass signal c1.

Figure 9:
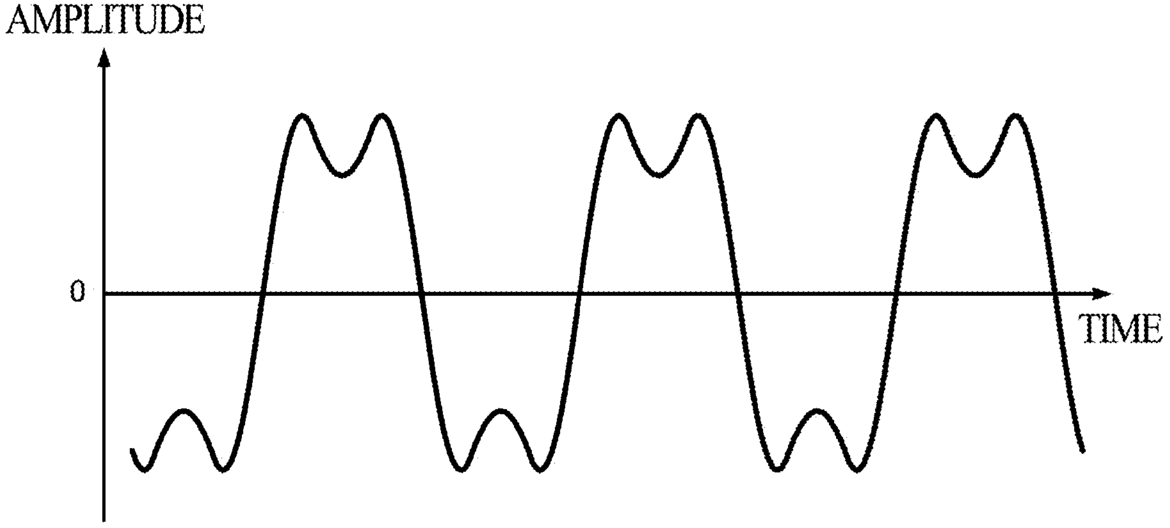
FIG. 9 is a diagram showing an example of a third bass signal.

FIG. 9 is a diagram showing an example of a third bass signal c3. As shown in FIG. 9, the low-pass filter 223 removes extra harmonics from the bass-range percussion instrument signal c2. The low-pass filter 223 has a cutoff frequency of 100 Hz. Thus, the third bass signal c3 output by the low-pass filter 223 has no extra harmonics. The cutoff frequency of the low-pass filter 223 is not limited to 100 Hz. For example, the cutoff frequency of the low-pass filter 223 may be within a range of 100 Hz plus or minus K % (for example, 20%).

The gain controller 224 adjusts the amplitude of the third bass signal c3. The gain controller 224 provides the synthesizer 24 with the low frequency signal c4 obtained by adjusting the amplitude of the third bass signal c3. A user who sets up the audio system 1 can set a gain of the gain controller 224 as appropriate.

In FIG. 1, the delay 23 delays the input audio signal a1. The delay 23 generates the delayed audio signal d1 by delaying the input audio signal a1. The delay 23 provides the delayed audio signal d1 to the synthesizer 24. A delay time of the delay 23 is preset to be equal to a sum of a delay time that occurs at the extractor 21 and a delay time that occurs at the generator 22. In other words, the delay time of the delay 23 is a time period required to generate the low frequency signal c4 from the input audio signal a1.

A bass-range signal has a slower rise than both a mid-range signal and a high-range signal. Thus, a delay time can be set such that the low frequency signal c4 reaches the synthesizer 24 before the delayed audio signal d1. In other words, the delay time of the delay 23 may be set to be longer than the time period required to generate the low frequency signal c4 from the input audio signal a1. In this way, the bass range can be further enhanced. The delay 23 may further include functions of a gain controller.

The synthesizer 24 generates the bass-range enhancement signal e1 from the low frequency signal c4 and the delayed audio signal d1. More specifically, the synthesizer 24 generates the bass-range enhancement signal e1 by adding the low frequency signal c4 to the delayed audio signal d1. The bass-range enhancement signal e1 is a signal that enhances bass-range frequency components of the input audio signal a1. As described above, the combination of the delay 23 and the synthesizer 24 is an example of the "second generator."

The amplifier 30 generates the amplified audio signal e2 by amplifying the bass-range enhancement signal e1 to a level suitable to drive the loudspeaker 40. The amplifier 30 provides the amplified audio signal e2 to the loudspeaker 40.

The loudspeaker 40 emits sounds dependent on the amplified audio signal e2.

A2: Summary of First Embodiment

As described above, the bass enhancement method according to the first embodiment includes extracting the percussion instrument signal b2 from the input audio signal a1, generating the low frequency signal c4 from the percussion instrument signal b2, and generating the bass-range enhancement signal e1 from the low frequency signal c4 and the input audio signal a1. The input audio signal a1 is a signal that includes the harmonic sound components and the inharmonic sound components. The frequency of the low frequency signal c4 is half that of the fundamental wave component of the percussion instrument signal b2. The bass-range enhancement signal e1 is a signal that enhances the bass-range frequency components of the input audio signal a1.

To enhance low frequencies of the harmonic sound components, a case can be conceived in which a bass-range signal is generated with a frequency half that of a fundamental wave component of the harmonic sound components with the bass-range signal then being added to the harmonic sound components. However, in this case, the harmonic sound components, to which the bass-range signal is added, may not include the harmonics of the bass-range signal. In addition, since the harmonic sound components constitute a continuous sound, the harmonic sound components, to which the bass-range signal is added, may be perceived as distorted. On the other hand, the inharmonic sound components have more random frequency components than the harmonic sound components, and constitute a non-continuous sound. Thus, when low frequencies of the inharmonic sound components are enhanced, the inharmonic sound components having the enhanced low frequencies are unlikely to be perceived as distorted. According to this method, low frequencies of the harmonic sound components are not enhanced, as a result of which, perception of distortion is substantially prevented. Moreover, since low frequencies of the inharmonic sound components are enhanced, attack and beat also are enhanced.

In the bass enhancement method according to the first embodiment, the inharmonic sound components include percussive sound components of one or more percussion instruments.

The percussive sound components have more random frequency components than the harmonic sound components, and do not have a continuous sound. Thus, when low frequencies of the percussive sound components are enhanced, it is unlikely that distortion will be perceived. According to this method, the low frequencies of the harmonic sound components are not enhanced, whereas the low frequencies of the percussive sound components are enhanced, as a result of which, in addition to bass, attack and beat also are enhanced.

In the bass enhancement method according to the first embodiment, the extracting of the percussion instrument signal b2 from the input audio signal a1 includes generating the first bass signal b1 from the input audio signal a1, and extracting the percussion instrument signal b2 from the first bass signal b1. The input audio signal a1 includes high frequency components including frequencies that are higher than a frequency band of the percussive sound components. The first bass signal b1 is a signal where the high frequency components of the input audio signal a1 have been reduced.

According to this method, the percussion instrument signal b2 is extracted from the first bass signal b1 where the high frequency components have been reduced. Thus, a calculation amount for extracting the percussion instrument signal b2 from the first bass signal b1 is reduced compared to that for extracting the percussion instrument signal b2 from the input audio signal a1 where the high frequency components are not reduced. As a result, it is possible to reduce a calculation load.

In the bass enhancement method according to the first embodiment, the generating of the low frequency signal c4 from the percussion instrument signal b2 includes generating the second bass signal c1 from the percussion instrument signal b2, and generating the low frequency signal c4 from the second bass signal c1. The percussion instrument signal b2 includes high frequency components including frequencies that are higher than the frequency band of the percussive sound components. The second bass signal c1 is a signal where the high frequency components of the percussion instrument signal b2 have been reduced.

According to this method, only low frequency components of the percussive sound components are enhanced. Thus, it is possible to further enhance both attack and beat.

In the bass enhancement method according to the first embodiment, the generating of the bass-range enhancement signal e1 includes generating the delayed audio signal d1, and generating the bass-range enhancement signal e1 by adding the low frequency signal c4 to the delayed audio signal d1. The delayed audio signal d1 is a signal obtained by delaying the input audio signal a1 for a time period required to generate the low frequency signal c4 from the input audio signal a1.

According to this method, a phase relationship between the low frequency signal c4 and the input audio signal a1 can be adjusted. Thus, sound with imperceptible distortion, enhanced attack, and enhanced beat can be emitted.

The bass enhancement apparatus 20 according to the first embodiment includes the extractor 21, the generator 22, the delay 23, and the synthesizer 24. The extractor 21 extracts the percussion instrument signal b2 from the input audio signal a1. The generator 22 generates the low frequency signal c4 from the percussion instrument signal b2. The synthesizer 24 generates the bass-range enhancement signal e1 from the low frequency signal c4 and the input audio signal a1.

According to this aspect, since low frequencies of the harmonic sound components are not enhanced, distortion is substantially prevented, while bass, attack, and beat of the percussive components are each enhanced.

In the first embodiment, the percussive sound components constitute an example of the "inharmonic sound components." The percussion instrument signal b2 is an example of the "inharmonic sound signal." The generator 22 is an example of the "first generator." The combination of the delay 23 and the synthesizer 24 is an example of the "second generator."

B: Modifications

This disclosure is not limited to the embodiment described above, and various modifications can be adopted within the scope of the disclosure. Specific modifications are described below. Two or more modifications freely selected from the following modifications may be combined as long as no conflict arises from such combination. In the description of the following modifications, elements having the same functions as in the embodiment described above are denoted by the same reference numerals used for like elements, and detailed description thereof is omitted, as appropriate.

B1: First Modification

Figure 10:
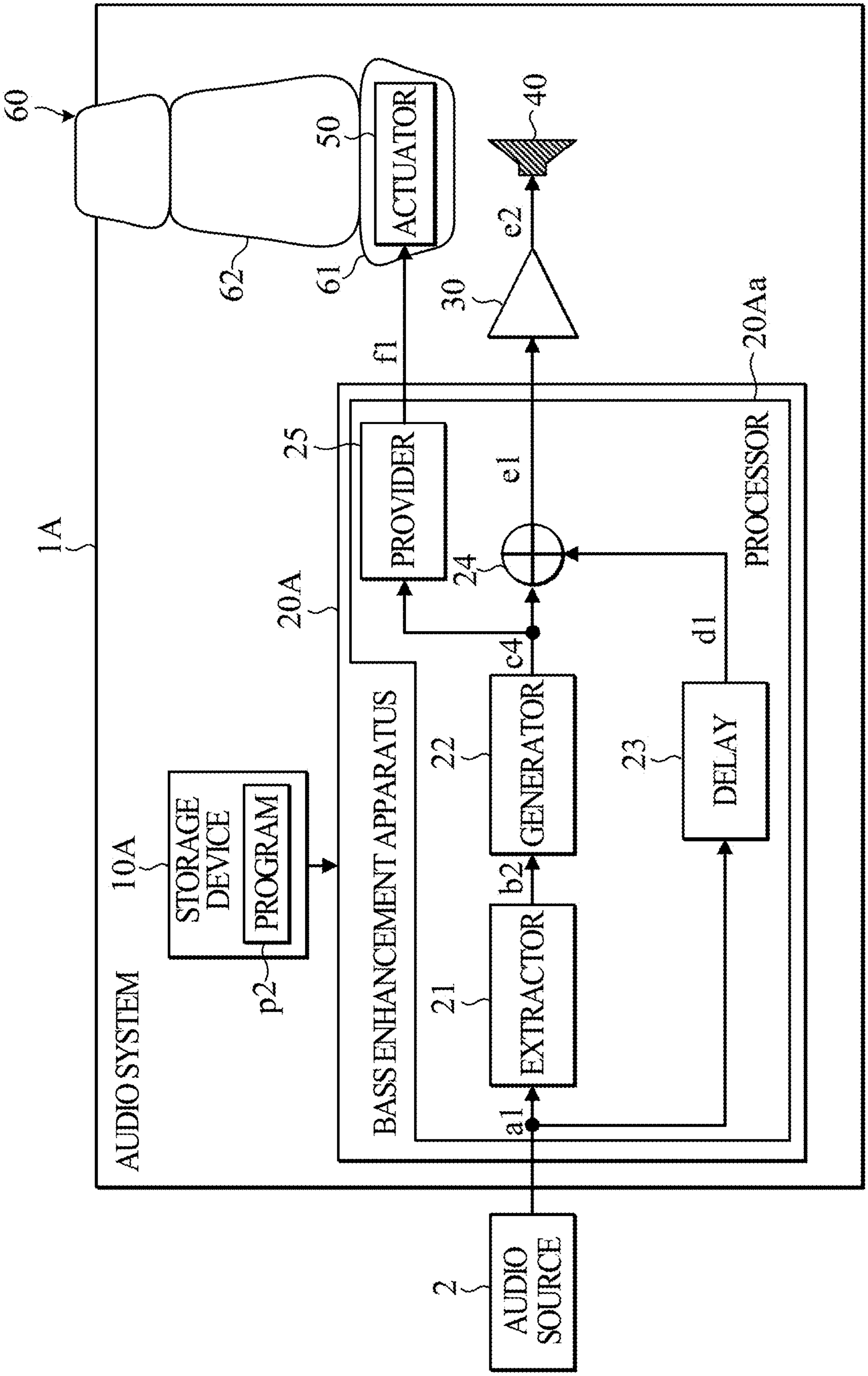
FIG. 10 is a diagram showing an example of an audio system that includes a bass enhancement apparatus according to a first modification.

Referring to FIG. 10, an audio system according to a first modification will now be described. To facilitate explanation in the following description, elements having the same configuration as those in the first embodiment are denoted by the same reference numerals used for like elements in the description of the first embodiment, and detailed description thereof is omitted as appropriate. Further, in the following description, explanation is focused on points of difference between the first modification and the first embodiment.

FIG. 10 is a diagram showing an example of an audio system 1A that includes a bass enhancement apparatus 20A according to the first modification. The audio system 1A is provided in a vehicle such as an automobile, as with the audio system 1 according to the first embodiment. The audio system 1A includes a storage device 10A, a bass enhancement apparatus 20A, the amplifier 30, the loudspeaker 40, and an actuator 50.

The storage device 10A includes one or more computer readable recording mediums. The storage device 10A includes one or more nonvolatile memories and one or more volatile memories. Examples of the nonvolatile memories include a ROM, an EPROM, and an EEPROM. Examples of the volatile memories include a RAM.

The storage device 10A stores a program p2, which includes instructions, and various kinds of information. The program p2 defines an operation of the bass enhancement apparatus 20A. The storage device 10A can store the program p2 that has been read from a storage device in a server (not shown). In this case, the storage device in the server is an example of a recording medium readable by a computer.

The bass enhancement apparatus 20A includes one or more processors 20Aa. The bass enhancement apparatus 20A reads the program p2 from the storage device 10A. In other words, the one or more processors 20Aa read the program p2 from the storage device 10A. The bass enhancement apparatus 20A executes the program p2 to function as the extractor 21, the generator 22, the delay 23, the synthesizer 24, and a provider 25. In other words, the one or more processors 20Aa execute the program p2 to function as the extractor 21, the generator 22, the delay 23, the synthesizer 24, and the provider 25. At least one of the extractor 21, the generator 22, the delay 23, the synthesizer 24, and the provider 25 may be configured as circuitry such as a DSP, an ASIC, a PLD, and an FPGA.

Since the extractor 21, the generator 22, the delay 23, and the synthesizer 24 shown in FIG. 10 have the same configuration as the extractor 21, the generator 22, the delay 23, and the synthesizer 24 shown in FIG. 1, description thereof is omitted.

The provider 25 provides the actuator 50 with an output audio signal f1 that includes the low frequency signal c4.

The actuator 50 is provided in a seat 61 of a vehicle seat 60. The actuator 50 includes, for example, a magnet coupled to a housing via a damper, a yoke coupled directly to the housing, and a coil wound around the yoke. A current flows through the coil in accordance with the output audio signal f1. As a result of the current flowing through the coil in accordance with the output audio signal f1, and a magnetic field generated by the magnet, a force occurs at the coil in a direction along an axis of the coil. Thus, in response to a change in the output audio signal f1, the yoke and the coil vibrate relative to the magnet in a direction along the axis of the coil. By use of the configuration described above, the actuator 50 vibrates the seat 61 in accordance with the output audio signal f1.

As described above, the bass enhancement apparatus 20A according to the first modification includes the extractor 21, the generator 22, and the provider 25. The extractor 21 extracts the percussion instrument signal b2 from the input audio signal a1. The input audio signal a1 is a signal that includes the harmonic sound components and the percussive sound components. The percussion instrument signal b2 is a signal representing the percussive sound components. The generator 22 generates the low frequency signal c4 based on the percussion instrument signal b2. The low frequency signal c4 has a frequency half that of the fundamental wave component of the percussion instrument signal b2. The provider 25 provides the output audio signal f1 to the actuator 50. The output audio signal f1 is the signal that includes the low frequency signal c4.

According to this modification, the bass enhancement apparatus 20A causes the seat 61 to vibrate in accordance with the output audio signal f1 imparted to an occupant seated in the vehicle seat 60. Thus, the occupant is able to sense attack and beat with his or her body as a whole as opposed to only with his or her ears. As a result, the seated occupant experiences enhanced attack and beat of a sound.

The actuator 50 is not limited to an actuator having a damper described above. For example, the actuator 50 may be a loudspeaker that emphasizes bass, such as a woofer.

The actuator 50 may be provided in a seatback 62 of the vehicle seat 60.

The audio system 1A according to the first modification is provided in a vehicle such as a car, and the actuator 50 vibrates the seat 61 of the vehicle seat 60 depending on the output audio signal f1. However, the audio system 1A may be applied within a building such as a house. In this case, the actuator 50 may be provided in a sofa, a chair, or a cushion, for example.

B2: Second Modification

In the first modification, the low frequency signal c4 is input to the provider 25. However, instead of the low frequency signal c4, the bass-range enhancement signal e1 in which the delayed audio signal d1 and the low frequency signal c4 are synthesized may be input to the provider 25, and the provider 25 may provide the bass-range enhancement signal e1 to the actuator 50.

B3: Third Modification

In the first embodiment, HPSS is used in the method for extracting the percussive sound components. However, the method for extracting the percussive sound components is not limited to that in which HPSS is used. As a method for extracting percussive sound components, various extraction methods may be used. For example, a well-known sound source separation technique may be used to extract the percussive sound components. As a sound source separation technique, a technique is known that separates, from a music signal in which musical vocal sounds and musical instrument sounds are mixed, each of the musical vocal sounds and each of the musical instrument sounds by use of a neural network trained by deep learning.

For example, in accordance with a Demucs technique developed by Facebook Research Inc., a recursive neural network based on U-Net architecture is used to analyze a temporal structure of a music sound signal. A result of the analysis is input to a convolutional neural network to separate individual sound sources in a frequency domain. In addition, an inverse Fourier transform is performed on a spectrogram of each of the separated sound sources to restore a waveform in a time domain (https://github.com/facebookresearch/demucs).

By applying the sound source separation technique described above, it is possible to extract the percussive sound components.

B4: Fourth Modification

As shown in FIG. 2, the extractor 21 according to the first embodiment includes the low-pass filter 211 provided in front of the percussive sound extractor 212. The low-pass filter 211 reduces high frequency components that are not required for calculations performed by the percussive sound extractor 212. Consequently, an amount of calculation for processing performed by the percussive sound extractor 212 can be reduced. Additionally, the low-pass filter 211 may be omitted.

B5: Fifth Modification

In the first embodiment, the generator 22 generates, as the low frequency signal c4, a signal having a frequency that is half that of the fundamental wave component of the percussion instrument signal b2. However, the low frequency signal c4 may be a signal having a frequency that is one N-th the frequency of the fundamental wave component of the percussion instrument signal b2, where N is an integer of 3 or more. For example, the generator according to the fifth modification may generate, as the low frequency signal c4, a signal having a frequency that is one-fourth the frequency of the fundamental wave component of the percussion instrument signal b2.

According to this modification, a signal is generated in which low frequency components are further enhanced. Thus, it is possible to further enhance both attack and beat.

B6: Sixth Modification

In the first embodiment, an audio system 1 is provided in a vehicle such as an automobile. However, the audio system 1 is also applicable to home audio. Further, the audio system 1 is also applicable to professional audio.

C: Supplemental Notes

The following configurations are derivable from the foregoing embodiments.

A bass enhancement method according to one aspect (first aspect) of the present disclosure is a computer-implemented bass enhancement method that includes: extracting, from an input audio signal including harmonic sound components and inharmonic sound components, an inharmonic sound signal representing the inharmonic sound components which are other than the harmonic sound components; generating, from the inharmonic sound signal, a low frequency signal with a frequency that is one N-th a frequency of a fundamental wave component of the inharmonic sound signal, where N is an integer greater than one; and generating, from the low frequency signal and the input audio signal, a bass-range enhancement signal that enhances bass-range frequencies of the input audio signal.

To enhance the low frequencies of the harmonic sound components, a case can be conceived in which a bass-range signal is generated with a frequency that is one N-th the frequency of the fundamental wave component of the harmonic sound components, with the bass-range signal then being added to the harmonic sound components. However, in this case, the harmonic sound components, to which the bass-range signal is added, may not include harmonics of the bass-range signal. In addition, since the harmonic sound components constitute a continuous sound, the harmonic sound components, to which the bass-range signal is added, may be perceived as distorted. On the other hand, the inharmonic sound components have more random frequency components than the harmonic sound components, and the inharmonic sound components rarely constitute a continuous sound. Thus, when the low frequencies of the inharmonic sound components are enhanced, the inharmonic sound components having the enhanced low frequencies are unlikely to be perceived as distorted. According to this method, low frequencies of the harmonic sound components are not enhanced, as a result of which, perception of distortion is substantially prevented. Moreover, since low frequencies of the inharmonic sound components are enhanced, both attack and beat also are enhanced.

In an example (second aspect) of the first aspect, the inharmonic sound components include percussive sound components.

The percussive sound components have more random frequency components than the harmonic sound components, and constitute a non-continuous sound. Thus, when low frequencies of the percussive sound components are enhanced, the percussive sound components having the enhanced low frequencies are unlikely to be perceived as distorted. According to this method, low frequencies of the harmonic sound components are not enhanced, whereas low frequencies of the percussive sound components are enhanced, thereby further enhancing both attack and beat.

In an example (third aspect) of the first aspect, the input audio signal includes high frequency components including frequencies that are higher than a frequency band of the inharmonic sound components, and the extracting of the inharmonic sound signal from the input audio signal includes: generating, from the input audio signal, a bass signal where the high frequency components of the input audio signal have been reduced; and extracting the inharmonic sound signal from the bass signal.

According to this aspect, the inharmonic sound signal is extracted from the first bass signal the high frequency components have been reduced. Thus, an amount of calculation required for the extraction is reduced compared to that required for extracting the inharmonic sound signal from the input audio signal in which the high frequency components are not reduced. As a result, it is possible to reduce a calculation load required for extraction.

In an example (fourth aspect) of the first aspect, the inharmonic sound signal includes high frequency components including frequencies that are higher than a frequency band of the inharmonic sound components, and the generating of the low frequency signal from the inharmonic sound signal includes: generating, from the inharmonic sound signal, a bass signal where the high frequency components of the inharmonic sound signal have been reduced; and generating the low frequency signal from the bass signal.

According to this aspect, only low frequency components of the inharmonic sound components are enhanced. Thus, it is possible to further enhance both attack and beat.

In an example (fifth aspect) of the first aspect, the generating of the bass-range enhancement signal includes: generating a delayed audio signal by delaying the input audio signal for a time period required to generate the low frequency signal from the input audio signal; and generating the bass-range enhancement signal by adding the delayed audio signal to the low frequency signal.

According to this aspect, a phase relationship between the low frequency signal and the input audio signal can be adjusted. Thus, sound with minimal distortion, enhanced attack, and enhanced beat can be emitted.

A bass enhancement apparatus according to another aspect (sixth aspect) of the present disclosure includes: at least one memory storing instructions; and at least one processor configured to execute the instructions to: extract, from an input audio signal including harmonic sound components and inharmonic sound components, an inharmonic sound signal representing the inharmonic sound components which are other than the harmonic sound components; generate, from the inharmonic sound signal, a low frequency signal with a frequency that is one N-th a frequency of a fundamental wave component of the inharmonic sound signal, where N is an integer greater than one; and generate, from the low frequency signal and the input audio signal, a bass-range enhancement signal that enhances bass-range frequencies of the input audio signal.

According to this aspect, the bass of the harmonic sound components is not enhanced. Thus, it is possible to substantially prevent distortion. In addition, the bass of the inharmonic sound components is enhanced. Thus, it is possible to enhance both attack and beat.

A bass enhancement apparatus according to yet another aspect (seventh aspect) of the present disclosure includes: at least one memory storing instructions; and at least one processor configured to execute the instructions to: extract, from an input audio signal including harmonic sound components and inharmonic sound components, an inharmonic sound signal representing the inharmonic sound components which are other than the harmonic sound components; generate, from the inharmonic sound signal, a low frequency signal with a frequency that is one N-th a frequency of a fundamental wave component of the inharmonic sound signal, where N is an integer greater than one; and provide an output audio signal including at least the low frequency signal to an actuator configured to vibrate a seat.

According to this aspect, the seat is vibrated in accordance with a signal that enhances bass components of the inharmonic sound components. Thus, it is possible to further enhance both attack and beat.

DESCRIPTION OF REFERENCE SIGNS

20 . . . bass enhancement apparatus, 21 . . . extractor, 22 . . . generator, 23 . . . delay, 24 . . . synthesizer, 25 . . . provider, 50 . . . actuator, 60 . . . vehicle seat, a1 . . . input audio signal, b1 . . . first bass signal, b2 . . . percussion instrument signal, c1 . . . second bass signal, c4 . . . low frequency signal, e1 . . . bass-range enhancement signal, d1 . . . delayed audio signal.

What is claimed is:

1. A computer-implemented bass enhancement method comprising:

extracting, from an input audio signal including harmonic sound components and inharmonic sound components, an inharmonic sound signal representing the inharmonic sound components, which are other than the harmonic sound components;

generating, from the inharmonic sound signal, a low frequency signal with a frequency that is one N-th a frequency of a fundamental wave component of the inharmonic sound signal, where N is an integer greater than one; and generating, from the low frequency signal and the input audio signal, a bass-range enhancement signal that enhances bass-range frequencies of the input audio signal, wherein the input audio signal includes high frequency components including frequencies that are higher than a frequency band of the inharmonic sound components, and wherein the extracting of the inharmonic sound signal from the input audio signal includes:

generating, from the input audio signal, a bass signal where the high frequency components of the input audio signal have been reduced; and extracting the inharmonic sound signal from the bass signal.

2. The bass enhancement method according to claim 1, wherein the inharmonic sound components include percussive sound components.

3. The bass enhancement method according to claim 1, wherein the generating of the bass-range enhancement signal includes:

generating a delayed audio signal by delaying the input audio signal for a time period required to generate the low frequency signal from the input audio signal; and generating the bass-range enhancement signal by adding the delayed audio signal to the low frequency signal.

4. A computer-implemented bass enhancement method comprising:

extracting, from an input audio signal including harmonic sound components and inharmonic sound components, an inharmonic sound signal representing the inharmonic sound components, which are other than the harmonic sound components;

generating, from the inharmonic sound signal, a low frequency signal with a frequency that is one N-th a frequency of a fundamental wave component of the inharmonic sound signal, where N is an integer greater than one; and generating, from the low frequency signal and the input audio signal, a bass-range enhancement signal that enhances bass-range frequencies of the input audio signal, wherein the inharmonic sound signal includes high frequency components including frequencies that are higher than a frequency band of the inharmonic sound components, and wherein the generating of the low frequency signal from the inharmonic sound signal includes:

generating, from the inharmonic sound signal, a bass signal where the high frequency components of the inharmonic sound signal have been reduced; and generating the low frequency signal from the bass signal.

5. The bass enhancement method according to claim 4, wherein the inharmonic sound components include percussive sound components.

6. The bass enhancement method according to claim 4, wherein the generating of the bass-range enhancement signal includes:

generating a delayed audio signal by delaying the input audio signal for a time period required to generate the low frequency signal from the input audio signal; and generating the bass-range enhancement signal by adding the delayed audio signal to the low frequency signal.

7. A bass enhancement apparatus comprising:

at least one memory storing instructions; and at least one processor configured to execute the instructions to:

extract, from an input audio signal including harmonic sound components and inharmonic sound components, an inharmonic sound signal representing the inharmonic sound components, which are other than the harmonic sound components;

generate, from the inharmonic sound signal, a low frequency signal with a frequency that is one N-th a frequency of a fundamental wave component of the inharmonic sound signal, where N is an integer greater than one; and generate, from the low frequency signal and the input audio signal, a bass-range enhancement signal that enhances bass-range frequencies of the input audio signal, wherein the input audio signal includes high frequency components including frequencies that are higher than a frequency band of the inharmonic sound components, and wherein the at least one processor, in extracting the inharmonic sound signal from the input audio signal:

generates, from the input audio signal, a bass signal where the high frequency components of the input audio signal have been reduced; and extracts the inharmonic sound signal from the bass signal.

8. A bass enhancement apparatus comprising:

at least one memory storing instructions; and at least one processor configured to execute the instructions to:

extract, from an input audio signal including harmonic sound components and inharmonic sound components, an inharmonic sound signal representing the inharmonic sound components, which are other than the harmonic sound components;

generate, from the inharmonic sound signal, a low frequency signal with a frequency that is one N-th a frequency of a fundamental wave component of the inharmonic sound signal, where N is an integer greater than one; and provide an output audio signal including at least the low frequency signal to an actuator configured to vibrate a seat, wherein the input audio signal includes high frequency components including frequencies that are higher than a frequency band of the inharmonic sound components, and wherein the at least one processor, in extracting the inharmonic sound signal from the input audio signal:

generates, from the input audio signal, a bass signal where the high frequency components of the input audio signal have been reduced; and extracts the inharmonic sound signal from the bass signal.

9. A bass enhancement apparatus comprising:

at least one memory storing instructions; and at least one processor configured to execute the instructions to:

extract, from an input audio signal including harmonic sound components and inharmonic sound components, an inharmonic sound signal representing the inharmonic sound components, which are other than the harmonic sound components;

generate, from the inharmonic sound signal, a low frequency signal with a frequency that is one N-th a frequency of a fundamental wave component of the inharmonic sound signal, where N is an integer greater than one; and generate, from the low frequency signal and the input audio signal, a bass-range enhancement signal that enhances bass-range frequencies of the input audio signal, wherein the inharmonic sound signal includes high frequency components including frequencies that are higher than a frequency band of the inharmonic sound components, and wherein the at least one processor, in generating the low frequency signal from the inharmonic sound signal:

generates, from the inharmonic sound signal, a bass signal where the high frequency components of the inharmonic sound signal have been reduced; and generates the low frequency signal from the bass signal.

10. A bass enhancement apparatus comprising:

at least one memory storing instructions; and at least one processor configured to execute the instructions to:

extract, from an input audio signal including harmonic sound components and inharmonic sound components, an inharmonic sound signal representing the inharmonic sound components, which are other than the harmonic sound components;

generate, from the inharmonic sound signal, a low frequency signal with a frequency that is one N-th a frequency of a fundamental wave component of the inharmonic sound signal, where N is an integer greater than one; and provide an output audio signal including at least the low frequency signal to an actuator configured to vibrate a seat, wherein the inharmonic sound signal includes high frequency components including frequencies that are higher than a frequency band of the inharmonic sound components, and wherein the at least one processor, in generating the low frequency signal from the inharmonic sound signal:

generates, from the inharmonic sound signal, a bass signal where the high frequency components of the inharmonic sound signal have been reduced; and generates the low frequency signal from the bass signal.

* * * * *